E. C. HARDEGEN.
DRIVING AXLE STRUCTURE FOR MOTOR VEHICLES.
APPLICATION FILED JULY 21, 1910.
997,997.
Patented July 18, 1911.
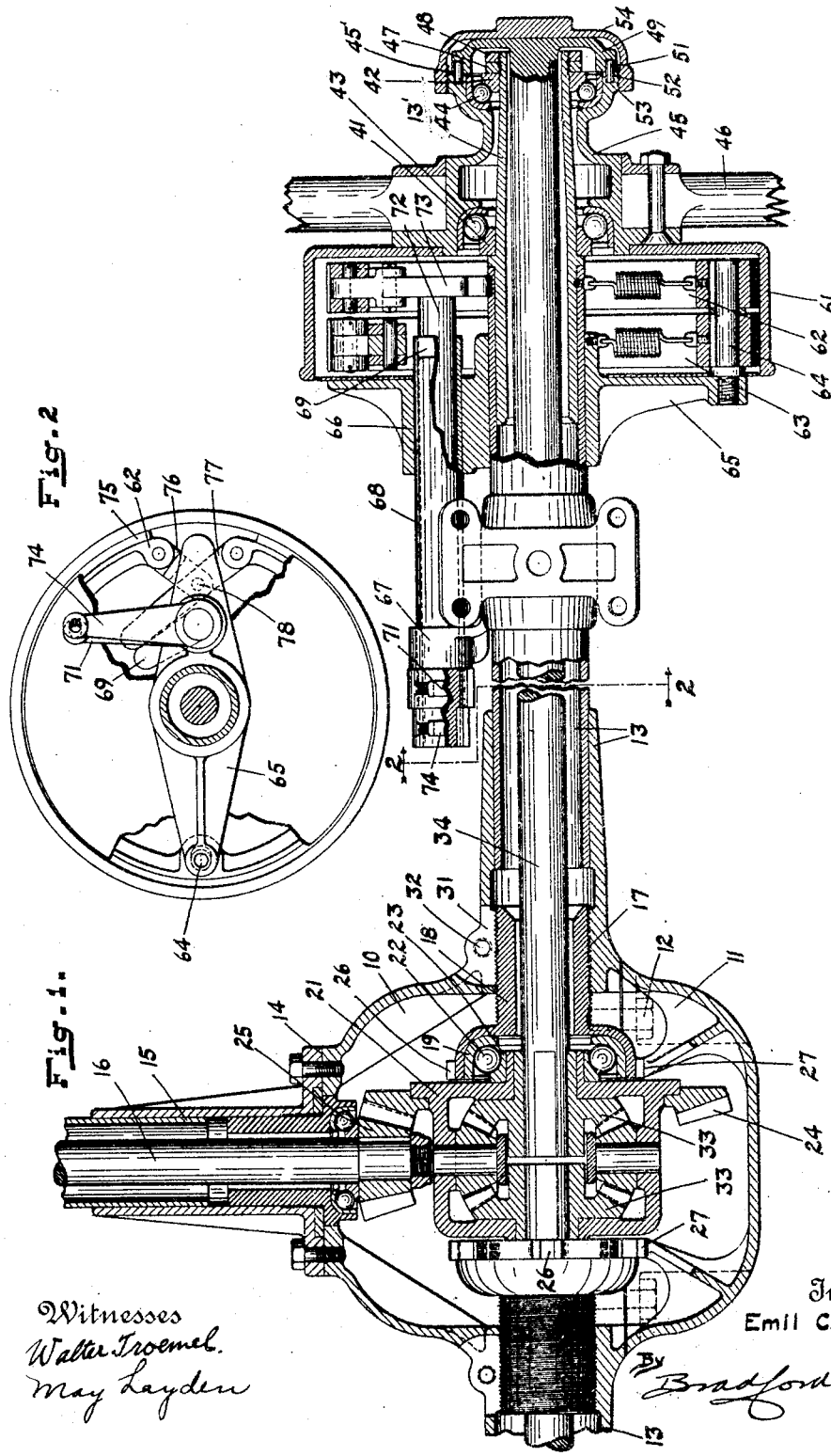
Witnesses
Walter Troemel.
May Layden
Inventor
Emil C. Hardegen
By Bradford Hood
Attorneys

UNITED STATES PATENT OFFICE.

EMIL C. HARDEGEN, OF INDIANAPOLIS, INDIANA, ASSIGNOR TO THE HARDEGEN AXLE COMPANY, OF INDIANAPOLIS, INDIANA, A CORPORATION OF INDIANA.

DRIVING-AXLE STRUCTURE FOR MOTOR-VEHICLES.

997,997.  Specification of Letters Patent.  Patented July 18, 1911.

Application filed July 21, 1910. Serial No. 573,137.

*To all whom it may concern:*

Be it known that I, EMIL C. HARDEGEN, a citizen of the United States, residing at Indianapolis, in the county of Marion and State of Indiana, have invented a new and useful Driving-Axle Structure for Motor-Vehicles, of which the following is a specification.

The object of my invention is to produce a rear axle structure for automobiles such that the differential gearing may be readily removed from the structure without the necessity of removal of any of the bearings therefor and also such that the retaining nuts for the traction wheels may be manipulated by an ordinary wrench.

The first part of my invention is applicable to rear axle structures of either the floating shaft or live shaft type, while the second portion of my invention is only adapted to use where the traction wheel is journaled upon a support from which the driving shaft is separable.

A further object of my invention is to provide an improved form of brake intimately associated with the rear axle structure.

The accompanying drawings illustrate my invention; Figure 1 is an axial section and Fig. 2 a transverse section on line 2—2 of Fig. 1, the spring seat being omitted.

In the drawings, 10 indicates a main or central inclosing casing structure which comprises in part a transversely removable cap 11 held in place by bolts or other suitable retaining members 12, the said cap being so formed as to permit free access to the interior of the casing 10 when removed and the withdrawal therefrom of any structure mounted therein. Secured to or formed integral with casing 10 are opposite tubular extensions 13, 13 and casing 10 is provided with a face 14 substantially parallel with the extensions 13 and opposite cap 11, upon which may be bolted or otherwise secured a tubular extension 15 within which the power shaft 16 is mounted and preferably journaled. The inner end of each tubular extension 13 is provided with comparatively fine threads 17 within which is threaded the shank 18 of a bearing cup 19. The cup 19 forms a bearing member for the differential gearing 21, and therefore is formed to suitably coöperate therewith, so as to support the same. (In the present drawings, I have shown the cup 19 provided with a plurality of ball bearings 22 which receive a bearing cone 23 carried by the differential casing. It will be readily understood, of course, that the exact character of bearing between cup 19 and the differential gearing 21 is not material so far as the present invention is concerned. The differential gearing 21 carries the usual main gear 24 which meshes with a driving pinion 25 carried by the power shaft 16. Each cup 19 is preferably provided upon its circumference with a plurality of teeth 26 which may be engaged by a detent tooth or projection 27 carried by cap 11, the arrangement being such that, when the cap 11 is in place, there can be no rotation of the cup 19. As a further precaution, the casing 10 may be split at 31 and a clamping bolt provided to pass into a threaded opening 32 formed at one side of the split 31 so that by tightening such bolt, the casing can be clamped upon the shank 18. The central gears 33 of the differential gearing 21 are formed in a well known manner to receive, by an axially separable non-rotative connection, the inner ends of the shaft sections 34.

In the present form, each of the tubular extensions 13 is provided with a wheel-carrying end 13′ provided with bearing cones 41 and 42 which receive ball bearings 43 and 44 respectively, which lie in corresponding cups carried in the hub 45 of the traction wheel 46. The cones 42, bearings 43 and wheel 46 are held in place upon the wheel-carrying extension 13′ by means of a retaining nut 47 and check nut 48 mounted upon a suitable threaded portion at the tip of the extension 13′.

It has heretofore been the custom to so form the detachable connection between the wheel and the shaft section that access to the nuts 47 and 48 was somewhat difficult and required a special wrench, and one of the objects of my present invention is to avoid this difficulty. Consequently, I so form the hub 45 that its end face 45′ does not extend into the plane of the innermost nut 47. The shaft section 34 is then provided at its end with a clutch-carrying flange 49 which, in the present instance, is provided on that face adjacent face 45′, with a plurality of axially extending clutch pins 51, each of which is adapted to enter a correspondingly formed socket 52 formed in face 45′ of hub 45. The outer end of hub

45 is threaded on its circumference, in the usual manner, as indicated at 53, to receive a retaining cup 54.

Hub 45 carries a brake cup or casing 61 having a horizontal flange of sufficient depth to receive internally two parallel brake rings 62 and 63 which are identical. Each of these brake rings is loosely mounted at its middle upon an axially extending pin 64 which projects into the cup 61. Pin 64 is carried by a bracket 65 secured to the tubular extension 13 of the rear axle structure. Journaled at 66 in bracket 65, and in a bracket 67 carried by the tubular extension 13, is a tube 68 which is projected into the bracket cup 61 and provided on its inner end with a radially extending finger 69. The opposite end of tube 68 is provided with a lever 71 by means of which it may be operated. Journaled within tube 68 is a shaft 72, the inner end of which is projected into the interior of cup 61 beyond the inner end of tube 66 and provided with a radially extending finger 73. The outer end of shaft 72 carries an arm or lever 74 by means of which it may be rocked. Each ring 62 and 63 is a split ring of ordinary form having a friction surface 75 adapted to frictionally engage the interior of cup 61. These rings are identical in construction as to their operating parts and therefore a description of one will be sufficient for both. Pivoted to one end of the friction ring, is a short link 76 and pivoted to the other end is a longer link 77 which is pivotally connected at an intermediate point 78 with the free end of link 76. The extended end of link 77 is projected into position to be engaged by one or the other of the arms 69 or 73, the arrangement being such that link 76 and the short arm of link 77 serve as an operating toggle for the brake and the extended end of link 77 serves as an operating lever for the toggle.

I claim as my invention:

1. In a rear axle structure, the combination of the main hollow body having oppositely extending tubular extensions and a removable cap, of a differential gearing mounted in said main body and having bearings at its ends, a pair of bearing cups mounted in said main body, said cups relatively axially adjustable to engage or entirely free the differential gearing to permit transverse withdrawal of the differential gearing upon removal of the cap, and shaft sections mounted within the tubular extensions of the main body and having an axial withdrawable non-rotative connection with the differential gearing.

2. In a rear axle structure, the combination with the main hollow body comprising a central portion, a pair of oppositely extending tubular extensions carried by said main portion, and a removable cap giving access to the interior of the middle portion, of a differential gearing mounted within said middle portion, a pair of bearing cups mounted within the middle portion and alined with the tubular extensions, at least one of said bearing cups having a threaded engagement with the main body whereby it may be axially adjusted toward and from the other cup and the space between the other cup varied from an amount exceeding the length of the differential gearing to an amount less than the length of the differential gearing whereby the differential gearing may be retained or released for transverse withdrawal, a detent carried by the removable cap for engaging said axially adjustable cup to prevent rotation thereof, and a pair of shaft sections mounted within the tubular extensions of the main body and having axially separable non-rotative connection with the differential gearing.

3. In a rear axle structure, the combination with the main hollow body comprising a central portion, a pair of oppositely extending tubular extensions carried by said main portion, and a removable cap giving access to the interior of the middle portion, of a differential gearing mounted within said middle portion, a pair of bearing cups mounted within the middle portion and alined with the tubular extensions, at least one of said bearing cups having a threaded engagement with the main body whereby it may be axially adjusted toward and from the other cup and the space between the other cup varied from an amount exceeding the length of the differential gearing to an amount less than the length of the differential gearing whereby the differential gearing may be retained or released for transverse withdrawal, and a pair of shaft sections mounted within the tubular extensions of the main body and having axially separable non-rotative connection with the differential gearing.

In witness whereof, I, have hereunto set my hand and seal at Indianapolis, Indiana, this 15th day of July, A. D. one thousand nine hundred and ten.

EMIL C. HARDEGEN. [L. S.]

Witnesses:
ARTHUR M. HOOD,
FRANK A. FAHLE.